United States Patent [19]

Bauer et al.

[11] Patent Number: 5,110,917
[45] Date of Patent: May 5, 1992

[54] WATER-SOLUBLE TRISAZO DYES

[75] Inventors: Wolfgang Bauer, Maintal; Willi Steckelberg, Hofheim; Josef Ritter, Schwalbach, all of Fed. Rep. of Germany

[73] Assignee: Cassella Aktiengesellschaft, Frankfurt, Fed. Rep. of Germany

[21] Appl. No.: 740,126

[22] Filed: Aug. 5, 1991

[30] Foreign Application Priority Data

Aug. 13, 1990 [DE]  Fed. Rep. of Germany ....... 4025611

[51] Int. Cl.$^5$ .................................... C07C 245/00
[52] U.S. Cl. ........................................... 534/815
[58] Field of Search ............................. 534/815, 809

[56] References Cited

PUBLICATIONS

Chem Abstracts; 95(6):44722e, 1981.

Chem Ab.: 106(6):39615b, 1986.

Primary Examiner—Marianne Cintins
Assistant Examiner—Jessica Nguyen
Attorney, Agent, or Firm—Connolly and Hutz

[57] ABSTRACT

The present invention relates to water-soluble trisazo dyes of the formula T

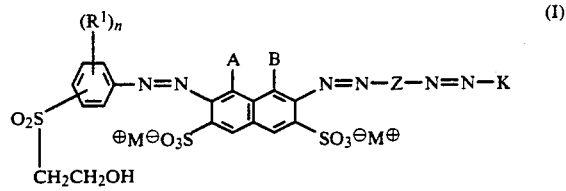

and process for the preparation thereof and to the use thereof.

6 Claims, No Drawings

WATER-SOLUBLE TRISAZO DYES

The present invention relates to water-soluble trisazo dyes of the formula I

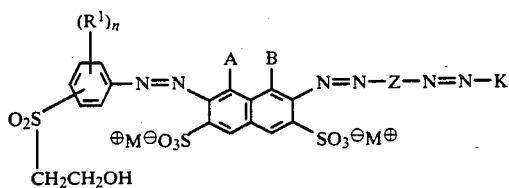

where
R$^1$ is hydrogen, alkyl of 1–2 carbon atoms, alkoxy of 1–2 carbon atoms, hydroxyl, halogen or carboxyl,
n is 1 or 2,
A and B are each hydroxyl or amino but are not identical to each other,
Z is the radical of an aromatic diamine of the formula II

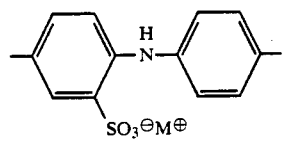

and K is the radical of a coupling component of the formula III

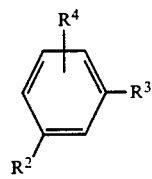

where
R$^2$ is hydroxyl or unsubstituted or HOOCCH$_2$— or HOCH$_2$CH$_2$-substituted amino,
R$^3$ is hydrogen, hydroxyl or unsubstituted or HOOCCH$_2$—, HOCH$_2$CH$_2$—, H$_2$NCO— or phenyl-substituted amino,
R$^4$ is hydrogen, alkyl of 1–2 carbon atoms, unsubstituted or methoxy- or ethoxy-substituted alkoxy of 1–2 carbon atoms or SO$_3$H, and
M$^\oplus$ is a cation or a mixture of different cations selected from the series consisting of lithium, sodium and potassium, or an unsubstituted or HOCH$_2$CH$_2$-monosubstituted or -polysubstituted ammonium cation.

The invention further provides a process for preparing trisazo dyes of the general formula I and their use for dyeing natural and synthetic fibre materials, in particular for dyeing leather, and for preparing writing inks and recording fluids for the ink-jet printing process.

Preferred trisazo dyes conform to the formula

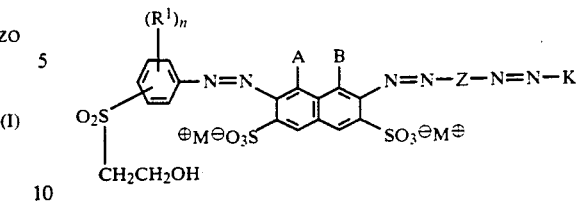

where
R$^1$ = H,
A, B and Z are each as defined above and K is a radical of a coupling component of the formula III where
R$^2$ = OH, NH$_2$, N$\overset{H}{-}$CH$_2$CH$_2$OH, N(CH$_2$CH$_2$OH)$_2$ or N$\overset{H}{-}$CH$_2$COOH,

R$^3$ = H, OH, NH$_2$,

N$\overset{H}{-}$CH$_2$CH$_2$OH,

N(CH$_2$CH$_2$OH)$_2$,

N$\overset{H}{-}$CH$_2$—COOH,

N$\overset{H}{-}$C$_6$H$_5$ or N$\overset{H}{-}$CO—NH$_2$,

R$^4$ = H, CH$_3$, C$_2$H$_5$, OCH$_3$, OC$_2$H$_5$, O—CH$_2$CH$_2$—OCH$_3$ or SO$_3$H.

Very particularly preferred trisazo dyes have the formula

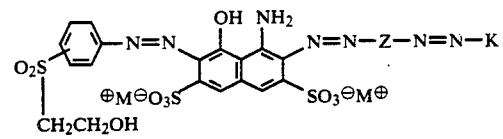

where Z and K are each as defined above and the water-solubilising sulpho groups are present in the form of the lithium and/or sodium and/or ammonium salts. Preferred ammonium salts are in particular C$_1$–C$_4$-alkanolammonium salts. Particular preference is given to those trisazo dyes which have two or more preferred features.

The preparation of trisazo dyes of the formula

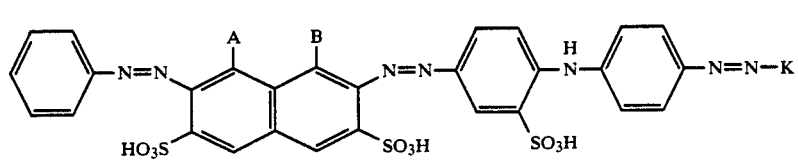

where A and B=OH or NH₂ and A≠B and K is the radical of a coupling component, is described for example in the following patent documents: DE-C-943 662, DE-C-10 46 221, DE-A-22 54 835, DE-B-31 34 063.

By analogy, the trisazo dyes of the invention are obtained using 2-hydroxyethylsulphonyl aniline derivatives of the formula IV

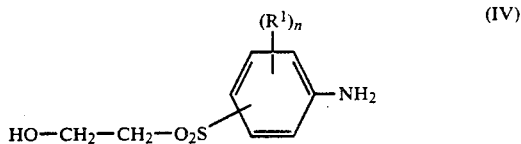

instead of aniline by reacting diazotised disazo dyes of the formula V

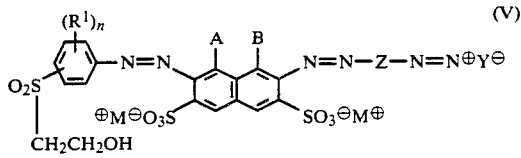

where $R^1$, A, B, $M^\oplus$ are each as defined above and $Y^\ominus$ is the anion of a mineral acid, with coupling components of the formula III

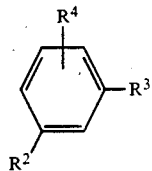

A further process for preparing the trisazo dyes of the invention comprises reacting disazo dyes of the formula VI

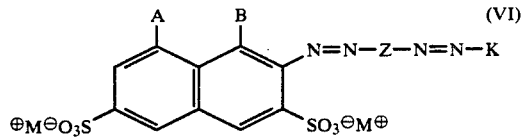

where A=OH, B=NH₂ and Z, K and also $M^\oplus$ are each as defined above, with diazonium salts of the formula VII

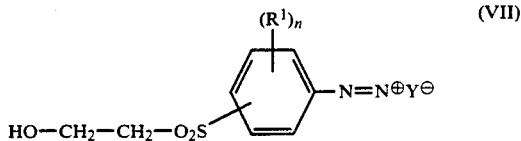

or monoazo dyes of the formula VIII

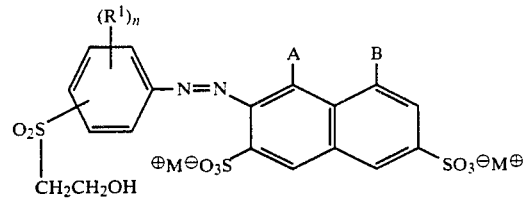

where A=NH₂ and B=OH, with diazotised monoazo dyes of the formula IX $$Y^\ominus \; ^\oplus N=N-Z-N=N-K \quad (IX)$$

Suitable diazo components of the formula IV are for example:
3-(2'-Hydroxyethylsulphonyl)aniline,
4-(2'-Hydroxyethylsulphonyl)aniline,
2,5-Dimethoxy-4-(2'-hydroxyethylsulphonyl)aniline,
4-(2'-Hydroxyethylsulphonyl)-2-methoxy-5-methylaniline,
4-(2'-Hydroxyethylsulphonyl)-2,6-dichloroaniline,
3-(2'-Hydroxyethylsulphonyl)-4-hydroxyaniline,
3-(2'-Hydroxyethylsulphonyl)-4-carboxyaniline,
3-(2'-Hydroxyethylsulphonyl)-4-chloroaniline.

Instead of the diazo components of the formula IV it is also possible to use their sulphuric esters of the formula X

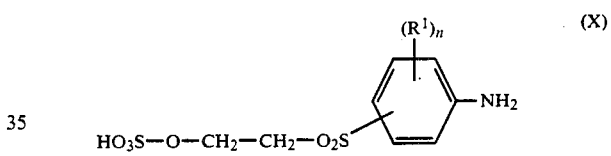

in which case the hydrolysis of the ester grouping of the formula X to give diazo components of the formula IV can take place before the diazotisation reaction by alkaline hydrolysis, preferably at pH 8–12 and temperatures of 50°–100° C., or after the coupling reaction by alkaline hydrolysis of the initial dye products.

Suitable coupling components of the formula III for the preparation of the dyes of the invention are for example: phenol, 1,3-diaminobenzene, 1,3-diaminobenzene-4-sulphonic acid, 1,3-diamino-4-methylbenzene, 1,3-diamino-4-methoxybenzene, 1,3-diamino-4-ethoxybenzene, 1,3-diamino-4-(2'-methoxyethoxy)benzene, 3-aminophenylurea, 1-amino-3-(2-hydroxyethylamino)benzene, 1-amino-3-carboxymethylaminobenzene, 3-aminophenol, 3-(2-hydroxyethylamino)phenol, 3-(carboxymethylamino)phenol, 3-phenylaminophenol, 3-aminophenol-4-sulphonic acid, 1,3-dihydroxybenzene.

The dyes of the invention are highly suitable for dyeing natural and synthetic fibre materials such as cotton, regenerated cellulose, paper, polyamide and wool and in particular for dyeing leather. Compared with the closest dyes, for example the dyes described in the patent specifications DE-C-943 662, DE-C-10 46 221 and DE-C-35 29 495, the trisazo dyes of the invention have surprising advantages, in particular in light fastness on polyamide or leather and also in the colour strength on leather, which was not foreseeable in the light of the structural similarity. Moreover, the dyes of the invention are highly suitable for preparing writing inks and recording fluids. The recording fluids can be admixed with conventional solvents, humectants, preservatives or amines as described for example in the patent document EP 324 943. Recording fluids which contain one or more dyes of the invention are suitable in particular for the ink-jet printing process. In said process they produce black prints of high quality which show very good crispness and brilliance and also good water, light and abrasion resistance. The dyes of the present invention are also advantageous on toxicological grounds. On storage, inks of the present invention do not precipitate as crystals which might cause nozzle blockage. Compared with the closest trisazo dyes described in DE-C-35 29 495, the dyes of the invention, being salt-free for the ink-jet printing process, are up to 40% more soluble in water and have a better water fastness on paper.

Recording fluids based on the dyes of the invention, moreover, have a longer shelf life and, surprisingly, a higher surface tension.

After the coupling reaction the dyes of the invention can be isolated with mineral acids in the form of the free acid of the formula

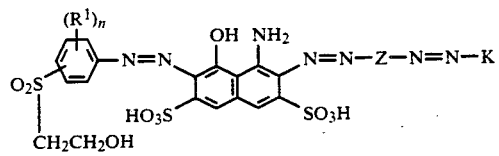

in which case the isolated dye acid is washed with water or acidulated water to remove the salts. The low-salt dye acid is then neutralised in aqueous medium with alkali metal hydroxides and/or alkali metal carbonates such as $LiOH$, $Li_2CO_3$, $NaOH$, $Na_2CO_3$, $KOH$, $K_2CO_3$ or with amines.

Suitable amines are for example: ammonia, ethanolamine, diethanolamine, triethanolamine, N-methyl-N-ethanolamine, N-methyl-N-diethanolamine, 2-(2-hydroxyethoxy)ethylamine, di-2-(2-hydroxyethoxy)ethylamine, and tri-2-(2-hydroxyethoxy)ethylamine.

In the Examples which follow, percentages are by weight and temperatures are in degrees Celsius.

EXAMPLE 1

27.9 g of 4,4'-diaminodiphenylamine-2-sulphonic acid are diazotised twice in a mixture of 200 g of water and 50 g of 30% strength hydrochloric acid with a solution of 13.8 g of sodium nitrite in 50 g of water at 0°-5° (ice). After the sodium nitrite solution has been added, the mixture is stirred at 0°-5° for about 1½ h, and excess nitrous acid is then removed with amidosulphuric acid.

Then 30 g of 1-amino-8-hydroxynaphthalene-3,6-disulphonic acid are dissolved in 100 g of water and 30% strength sodium hydroxide solution in such a way that the solution has a pH of from 6.5 to 6.7. The neutral solution of 1-amino-8-hydroxynaphthalene-3,6-disulphonic acid is then gradually added dropwise to the solution of the tetrazo component adjusted with sodium acetate to pH 2, and the single-sided coupling is completed by stirring at 10°-15°.

The ice-cooled suspension of the diazotised monoazo dye is then admixed at 0°-5° with a solution of 3-(2-hydroxyethylsulphonyl)diazobenzene prepared at 0° from 19.1 g of 3-(2-hydroxyethylsulphonyl)aniline, 30 g of 30% strength hydrochloric acid and a solution of 6.7 g of sodium nitrite in 40 g of water, and adjusted to a pH of from 8.5 to 9 with 10% strength sodium carbonate solution. The resulting suspension of a bluish green diazotised disazo dye is then admixed with a solution of 10.5 g of 3-aminophenol in 120 g of water. The coupling is complete after about one hour of stirring at 15°-20°. A 38% strength sulphuric acid is added to pH 2 to precipitate the dye acid, which is then washed with 1 kg of 0.25M sulphuric acid, suspended in 1 l of water and neutralised with 50.5 g of 10N sodium hydroxide solution.

The dye solution obtained is dried to obtain a mixture of the dyes of the formulae

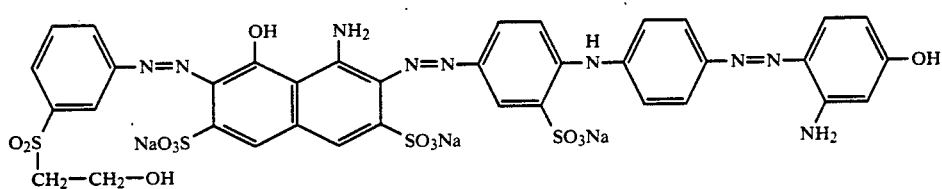

and

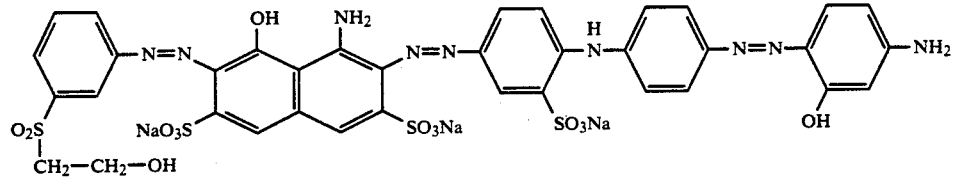

in the form of a black, low-electrolyte powder.
Yield: 104.2 g ($\lambda max_1$: 623 nm, $\lambda max_2$: 484 nm)

COMPARATIVE EXAMPLE

Example 1 is repeated, except that the 19.1 g of 3-(2-hydroxyethylsulphonyl)aniline are replaced by 8.8 g of aniline, affording a mixture of the dyes of the formulae

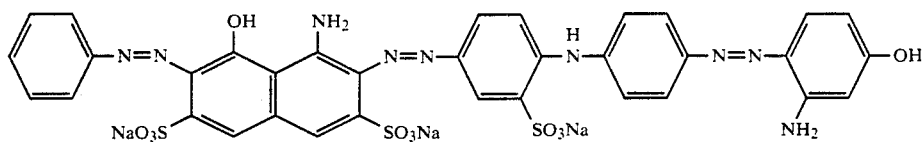

and

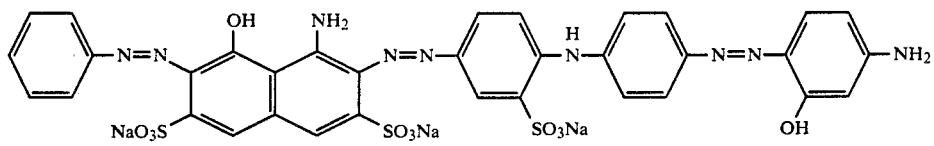

in a yield of 90 g in the form of a black crystalline powder: ($\lambda max_1$: 623 nm, $\lambda max_2$: 485 nm)

Surprisingly, compared with the comparative example, the dye obtained as described in Example 1 has a much better light fastness on polyamide or leather, a 40% better water solubility, and a distinctly improved bleed resistance in the case of paper dip dyeing. Dyeings on leather moreover also show distinctly improved colour strength.

Table I reveals the structural constitutions of further dyes of the formula I prepared as described in Example 1, with column 1 showing the diazo component used of the formula IV

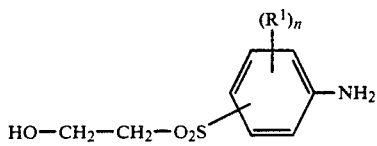

column 2 showing the coupling component used of the formula III

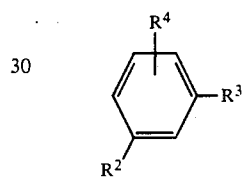

column 3 showing the cation $M^\oplus$ used, and column 4 showing the hue of the dye on leather.

| Example | Diazo component of formula IV | Coupling component of formula III | Cation $M^\oplus$ | Hue on leather |
|---|---|---|---|---|
| 2 | HOCH$_2$CH$_2$O$_2$S—⟨C$_6$H$_4$⟩—NH$_2$ | ⟨C$_6$H$_3$(NH$_2$)⟩—OH | 3 Na$^\oplus$ | black |
| 3 | HOCH$_2$CH$_2$O$_2$S—⟨C$_6$H$_2$(OCH$_3$)(CH$_3$)⟩—NH$_2$ | ⟨C$_6$H$_3$(NH$_2$)⟩—OH | 3 Li$^\oplus$ | black |
| 4 | HOCH$_2$CH$_2$O$_2$S—⟨C$_6$H$_2$(OCH$_3$)(OCH$_3$)⟩—NH$_2$ | ⟨C$_6$H$_3$(NH$_2$)⟩—OH | 3 Li$^\oplus$ | black |
| 5 | ⟨C$_6$H$_4$(SO$_2$CH$_2$CH$_2$OH)⟩—NH$_2$ | ⟨C$_6$H$_4$⟩—OH | 3 Na$^\oplus$ | green |

-continued

| Example | Diazo component of formula IV | Coupling component of formula III | Cation M⊕ | Hue on leather |
|---|---|---|---|---|
| 6 | 3-amino-phenyl-SO$_2$CH$_2$CH$_2$OH | resorcinol (1,3-dihydroxybenzene) | 3 Na⊕ | blackish green |
| 7 | 3-amino-phenyl-SO$_2$CH$_2$CH$_2$OH | 1,3-diaminobenzene | 3 Na⊕ | black |
| 8 | 3-amino-phenyl-SO$_2$CH$_2$CH$_2$OH | 2-amino-4-methyl-anisole (OCH$_3$, NH$_2$, CH$_3$ substituted benzene) | 3 Na⊕ | black |
| 9 | 3-amino-phenyl-SO$_2$CH$_2$CH$_2$OH | 3-(N-carboxymethylamino)phenol (NHCH$_2$COOH, OH) | 3 Na⊕ | black |
| 10 | 3-amino-phenyl-SO$_2$CH$_2$CH$_2$OH | 2-methyl-1,3-diamino-benzene (CH$_3$, NH$_2$, NH$_2$) | 3 H$_2$N⊕(CH$_2$CH$_2$OH)$_2$ | black |
| 11 | 3-amino-phenyl-SO$_2$CH$_2$CH$_2$OH | 3-(2-hydroxyethylamino)phenol (NHCH$_2$CH$_2$OH, OH) | 3 HN⊕(CH$_2$CH$_2$OH)$_3$ | black |
| 12 | 3-amino-phenyl-SO$_2$CH$_2$CH$_2$OH | 2,4-diamino-benzenesulfonic acid (SO$_3$H, NH$_2$, NH$_2$) | 3 Na⊕ | black |
| 13 | 3-amino-phenyl-SO$_2$CH$_2$CH$_2$OH | 3-aminophenol (OH, NH$_2$) | 3 Li⊕ | black |
| 14 | 3-amino-phenyl-SO$_2$CH$_2$CH$_2$OH | 3-aminophenol (OH, H$_2$N) | 1 Li⊕, 2 Na⊕ | black |

EXAMPLE 15

A solution of 4-(2-hydroxyethylsulphonyl)benzenediazonium chloride prepared at 0°–5° from 20.1 g of 4-(2-hydroxyethylsulphonyl)aniline, 30 g of 30% strength aqueous hydrochloric acid and a solution of 7.6 g of sodium nitrite in 30 g of water is admixed with a solution of 31.9 g of 1-amino-8-hydroxynaphthalene-3,6-disulphonic acid in 100 g of water which has been adjusted to pH 6 with sodium carbonate.

Table II lists further black trisazo dyes of the general formula I which are obtainable as described in Example 15.

| Example | Diazo component of formula IV | Coupling component of formula III | Cation M$^\oplus$ | Hue on leather |
|---|---|---|---|---|
| 14 | CH$_2$CH$_2$SO$_2$—⟨C$_6$H$_4$⟩—NH$_2$ (with OH on CH$_2$) | ⟨C$_6$H$_3$⟩(NH$_2$)(NH$_2$) | 3 Na$^\oplus$ | black |
| 15 | CH$_2$CH$_2$SO$_2$—⟨C$_6$H$_4$⟩—NH$_2$ (with OH on CH$_2$) | ⟨C$_6$H$_3$⟩(SO$_3$H)(NH$_2$)(OH) | 3 Na$^\oplus$ | black |
| 16 | ⟨C$_6$H$_4$⟩—NH$_2$ (with SO$_2$CH$_2$CH$_2$OH) | ⟨C$_6$H$_3$⟩(OH)(NH$_2$) | 3 Na$^\oplus$ | black |

After the coupling has ended, the suspension of the red monoazo dye is admixed with a bisdiazonium salt solution obtained by tetrazotisation of 27.9 g of 4,4'-diaminodiphenylamino-2-sulphonic acid with 13.8 g of sodium nitrite in a mixture of 50 g of 32% strength hydrochloric acid and 200 g of water, ice-cooled to 0°–5°.

The pH is then adjusted to 7.5 over 30 minutes with a 10% strength sodium carbonate solution cooled to 5°. The single-sided coupling is complete after 15 minutes, whereupon the mixture is admixed with a solution of 10.9 g of 3-aminophenol in 150 g of water. The mixture is subsequently stirred for 3 hours, 25% strength sulphuric acid is added to pH 1.5, and the precipitated dye acid is isolated by filtration. The filter residue is washed with 0.5M sulphuric acid, the moist filter cake is introduced into 1.2 l of water, and the acid product suspension is neutralised with 5N lithium hydroxide solution.

The dye solution obtained is dried to obtain a mixture of the dyes of the formulae

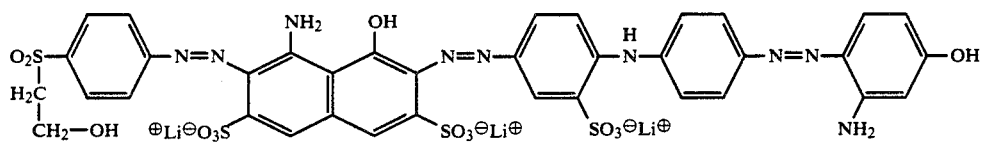

and

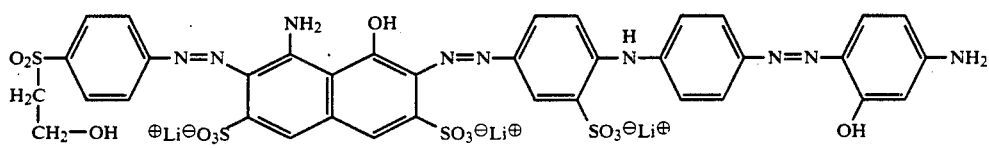

Yield: 120.3 g of black powder ($\lambda max_1$: 620 nm, $\lambda max_2$: 481 nm)

We claim:
1. Water-soluble trisazo dyes of the formula I

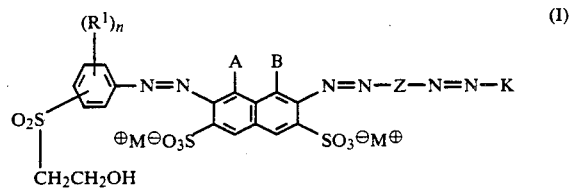

wherein
$R^1$ is hydrogen, alkyl of 1-2 carbon atoms, alkoxy of 1-2 carbon atoms, hydroxyl, halogen or carboxyl,
n is 1 or 2,
A and B are each hydroxyl or amino but are not identical to each other,
Z is the radical of an aromatic diamine of the formula II

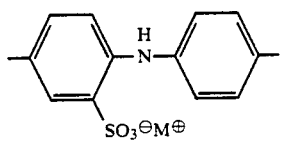

(II)

and K is the radical of a coupling component of the formula III

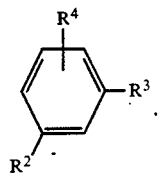

(III)

wherein

R² is hydroxyl or unsubstituted or HOOCCH₂— or HOCH₂CH₂-substituted amino,

R³ is hydrogen, hydroxyl or unsubstituted or HOOCCH₂—, HOCH₂CH₂—, H₂NCO— or phenyl-substituted amino, R⁴ is hydrogen, alkyl or 1-2 carbon atoms, unsubstituted or methoxy- or ethoxy-substituted alkoxy of 1-2 carbon atoms or SO₃H, and M⊕ is a cation or a mixture of different cations selected from the group consisting of lithium, sodium and potassium, or an unsubstituted or HOCH₂CH₂-monosubstituted or -polysubstituted ammonium cation.

2. Water-soluble trisazo dyes according to claim 1, wherein R¹ is hydrogen.

3. Water-soluble trisazo dyes according to claim 1, wherein

R²=OH, NH₂, $$\overset{H}{N}-CH_2CH_2OH.$$

N(CH₂CH₂OH)₂ or $$-\overset{H}{N}-CH_2COOH.$$

R³=H, OH, NH₂, $$\overset{H}{N}-CH_2CH_2OH,$$

N(CH₂CH₂OH)₂, $$\overset{H}{N}-CH_2COOH,$$

$$\overset{H}{N}-C_6H_5 \text{ or } \overset{H}{N}-\overset{\overset{O}{\parallel}}{C}-NH_2$$

R⁴=H, CH₃, C₂H₅, OCH₃, OC₂H₅, O—CH₂CH₂—OCH₃ or SO₃H.

4. Water-soluble trisazo dyes according to claim 1, wherein A=OH and B=NH₂.

5. Water-soluble trisazo dyes according to claim 1, wherein M⊕=Li⊕, Na⊕ or

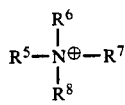

where R⁵, R⁶, R⁷ and R⁸ are each hydrogen or alkyl of 1-4 carbon atoms which is unsubstituted or substituted by hydroxyl or —OCH₂CH₂OH.

6. Process for dyeing leather comprising dyeing the leather with the water-soluble trisazo dyes according to claim 1.

* * * * *